United States Patent
Lee et al.

(10) Patent No.: US 11,697,753 B2
(45) Date of Patent: Jul. 11, 2023

(54) METHOD OF TREATING A SURFACE, SURFACE-MODIFIED ABRASIVE PARTICLES, AND RESIN-BOND ABRASIVE ARTICLES

(71) Applicant: 3M INNOVATIVE PROPERTIES COMPANY, St. Paul, MN (US)

(72) Inventors: Hae-Seung H. Lee, Woodbury, MN (US); Melissa C. Schillo-Armstrong, Stillwater, MN (US); Babu N. Gaddam, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 374 days.

(21) Appl. No.: 16/973,281

(22) PCT Filed: Jun. 6, 2019

(86) PCT No.: PCT/IB2019/054741
§ 371 (c)(1),
(2) Date: Dec. 8, 2020

(87) PCT Pub. No.: WO2019/239267
PCT Pub. Date: Dec. 19, 2019

(65) Prior Publication Data
US 2021/0246345 A1 Aug. 12, 2021

Related U.S. Application Data

(60) Provisional application No. 62/684,833, filed on Jun. 14, 2018.

(51) Int. Cl.
*C09K 3/14* (2006.01)
*B24D 3/00* (2006.01)
*B24D 18/00* (2006.01)

(52) U.S. Cl.
CPC ............ *C09K 3/1436* (2013.01); *B24D 3/007* (2013.01); *B24D 18/0072* (2013.01)

(58) Field of Classification Search
CPC .. B24D 3/007; B24D 18/0072; C09K 3/1436; C08G 59/32; C08G 59/50
See application file for complete search history.

(56) References Cited

U.S. PATENT DOCUMENTS

| | | |
|---|---|---|
| 1,910,444 A | 5/1933 | Nicholson |
| 2,705,223 A | 3/1955 | Ren |
| 3,041,156 A | 6/1962 | Rowse |
| 3,496,250 A | 2/1970 | Czerwinski |
| 4,314,827 A | 2/1982 | Leitheiser |
| 4,623,364 A | 11/1986 | Cottringer |
| 4,652,275 A | 3/1987 | Bloecher |
| 4,744,802 A | 5/1988 | Schwabel |
| 4,770,671 A | 9/1988 | Monroe |
| 4,799,939 A | 1/1989 | Bloecher |
| 4,881,951 A | 11/1989 | Wood |
| 4,948,449 A | 8/1990 | Tarbutton |
| 4,997,461 A | 3/1991 | Markhoff-Matheny |
| 5,009,675 A | 4/1991 | Kunz |
| 5,011,508 A | 4/1991 | Wald |
| 5,042,991 A | 8/1991 | Kunz |
| 5,085,671 A | 2/1992 | Martin |
| 5,152,917 A | 10/1992 | Pieper |
| 5,164,348 A | 11/1992 | Wood |
| 5,213,591 A | 5/1993 | Celikkaya |
| 5,352,254 A | 10/1994 | Celikkaya |
| 5,435,816 A | 7/1995 | Spurgeon |
| 5,466,729 A * | 11/1995 | Guillet ................. C08G 59/504 427/302 |
| 5,551,963 A | 9/1996 | Larmie |
| 5,629,380 A | 5/1997 | Baldwin |
| 5,645,619 A | 7/1997 | Erickson |
| 5,672,097 A | 9/1997 | Hoopman |
| 5,946,991 A | 9/1999 | Hoopman |
| 5,975,987 A | 11/1999 | Hoopman |
| 6,008,313 A | 12/1999 | Walker |
| 6,129,540 A | 10/2000 | Hoopman |

(Continued)

FOREIGN PATENT DOCUMENTS

| | | |
|---|---|---|
| CN | 101180334 A | 5/2008 |
| CN | 102209740 A | 10/2011 |
| CN | 102482514 A | 5/2012 |
| DE | 69408314 | 7/1998 |
| EP | 1418021 | 5/2004 |
| EP | 1584657 | 10/2015 |
| EP | 2223966 | 8/2017 |
| JP | 2014-208829 A | 11/2014 |
| WO | WO 91/015550 | 10/1991 |
| WO | WO 94/29390 A1 | 12/1994 |
| WO | WO 2016/105997 | 6/2016 |
| WO | WO 2017/062482 | 4/2017 |
| WO | WO 2017/189388 | 11/2017 |
| WO | WO 2017/192426 | 11/2017 |
| WO | WO 2019/099603 | 5/2019 |
| WO | WO 2019/239346 | 12/2019 |

OTHER PUBLICATIONS

Riew, "Rubbery-Modified Thermoset Resins", Advances in Chemistry Series No. 208, American Chemical Society, Washington, 1984, 8 pages.

(Continued)

*Primary Examiner* — Pegah Parvini

(57) ABSTRACT

An adhesion promoter comprises a reaction product of: a) a polyepoxide; b) an aminosilane represented by the formula $HNR^1R^2$. $R^1$ and $R^2$ independently represent $-Z-SiL_3$. Each Z independently represents a divalent linking group having from 1 to 12 carbon atoms, and each L independently represents a hydrolyzable group; and c) an isocyanatosilane represented by the formula $O=C=N-Z-SiL_3$, wherein Z and L are as previously defined. The adhesion promoter may be used to treat a surface of a substrate such as an abrasive particle, which may be included in a resin-bond abrasive article.

20 Claims, 1 Drawing Sheet

(56) References Cited

U.S. PATENT DOCUMENTS

| | | |
|---|---|---|
| 6,277,161 B1 | 8/2001 | Castro |
| 7,229,683 B2 | 6/2007 | Fischer |
| 7,744,991 B2 | 6/2010 | Fischer |
| 8,142,531 B2 | 3/2012 | Adefris |
| 8,476,334 B2 | 7/2013 | Illsley |
| 2002/0026752 A1 | 3/2002 | Culler |
| 2007/0027233 A1 | 2/2007 | Yamaguchi |
| 2009/0165394 A1 | 7/2009 | Culler |
| 2009/0169816 A1 | 7/2009 | Erickson |
| 2011/0126980 A1 | 6/2011 | Campbell |
| 2013/0012112 A1* | 1/2013 | Hsu .................. D04H 1/60 451/532 |
| 2013/0037213 A1 | 2/2013 | Frick |
| 2013/0040537 A1* | 2/2013 | Schwabel ............ C09K 3/1409 451/28 |
| 2013/0225725 A1 | 8/2013 | Campbell |
| 2016/0200075 A1 | 7/2016 | Dietze |
| 2017/0335070 A1 | 11/2017 | Erdodi |
| 2018/0030319 A1 | 2/2018 | Chen |

OTHER PUBLICATIONS

International Search Report for PCT International Application No. PCT/IB2019/054741, dated Oct. 10, 2019, 4 pages.

* cited by examiner

METHOD OF TREATING A SURFACE, SURFACE-MODIFIED ABRASIVE PARTICLES, AND RESIN-BOND ABRASIVE ARTICLES

TECHNICAL FIELD

The present disclosure broadly relates to adhesion promoters, surfaces modified using the adhesion promoters, surface-modified abrasive particles, and resin-bond abrasive articles that can be made using them.

BACKGROUND

Bonded abrasive articles have abrasive particles retained in a binder (also known in the art as a bonding matrix or binder material) that bonds them together as a shaped mass. Examples of typical bonded abrasives include grinding wheels, stones, hones, and cut-off wheels. The binder can be an organic resin (resin-bond), a ceramic or glassy material (vitreous bond), or a metal (metal bond).

Cut-off wheels are typically relatively thin wheels used for general cutting operations. The wheels are typically about 1 to about 200 centimeters in diameter, and several millimeters to several centimeters thick (with greater thickness for the larger diameter wheels). They may be operated at speeds from about 1000 to 50000 revolutions per minute, and are used for operations such as cutting polymer, composite metal, or glass, for example, to nominal lengths. Cut-off wheels are also known as "industrial cut-off saw blades" and, in some settings such as foundries, as "chop saws". As their name implies, cut-off wheels are used to cut stock such as, for example, metal rods, by abrading through the stock.

With bonded abrasive articles, properties such as cutting rate and durability are important. For example, in the case of cut-off wheels, cutting performance may decline by more than half after relatively short usage. There is a continuing need for new resin-bond abrasives that have improved abrading properties and/or reduced cost at the same performance level.

PCT Publication No. WO 2017/062482 A1 discloses an epoxy-functional silane coupling agent for use in modifying the surface of abrasive particles that may be included in a phenolic resin-bond abrasive article.

SUMMARY

The present inventors have discovered that epoxy-silane coupling agent of PCT Publication No. WO 2017/062482 A1 (Schillo-Armstrong), which may be considered an adhesion promoter, when used in a low-temperature cured phenolic resin-bond system, is prone to deterioration of performance due to aging. Through diligent research, the present inventors have discovered that the aging deterioration is caused at least in part by residual hydroxyl groups on the epoxy-silane coupling agent, and devised an ingenious solution, i.e., capping the hydroxyl groups with an isocyanatosilane compound, which both removes the hydroxyl group and introduces another hydrolyzable silane group.

Accordingly, in a first aspect, the present disclosure provides an adhesion promoter comprising at least one ring-opened adduct of:
a) a polyepoxide having at least two epoxy groups;
b) an aminosilane represented by the formula $HNR^1R^2$ wherein $R^1$ and $R^2$ independently represent —Z—SiL$_3$, wherein each Z independently represents a divalent linking group having from 1 to 12 carbon atoms, and wherein each L independently represents a hydrolyzable group, and
c) an isocyanatosilane represented by the formula $O=C=N-Z-SiL_3$ wherein Z and L are as previously defined.

In a second aspect, the present disclosure provides a method of treating a surface of a substrate having chemically-bound surface hydroxyl groups, the method comprising:
providing an adhesion promoter comprising at least one ring-opened adduct of:
a) a polyepoxide having at least two epoxy groups;
b) an aminosilane represented by the formula $HNR^1R^2$ wherein $R^1$ and $R^2$ independently represent —Z—SiL$_3$, wherein each Z independently represents a divalent linking group having from 1 to 12 carbon atoms, and wherein each L independently represents a hydrolyzable group, and
c) an isocyanatosilane represented by the formula $O=C=N-Z-SiL_3$ wherein Z and L are as previously defined; and
contacting the adhesion promoter with the surface of the substrate.

In a third aspect, the present disclosure provides an abrasive particle having an outer surface with an adhesion-modifying layer covalently bound thereto, wherein the adhesion-modifying layer comprises a reaction product of an adhesion promoter and hydroxyl groups covalently bound to the outer surface of the abrasive particle, wherein the adhesion promoter comprises at least one ring-opened adduct of:
a) a polyepoxide having at least two epoxy groups;
b) an aminosilane represented by the formula $HNR^1R^2$ wherein $R^1$ and $R^2$ independently represent —Z—SiL$_3$, wherein each Z independently represents a divalent linking group having from 1 to 12 carbon atoms, and wherein each L independently represents a hydrolyzable group, and
c) an isocyanatosilane represented by the formula $O=C=N-Z-SiL_3$ wherein Z and L are as previously defined.

In yet another aspect, the present disclosure provides a resin-bond abrasive article comprising a plurality of abrasive particles according to the present disclosure retained in a binder material.

As used herein, the term "chemically bound" means that atoms and/or groups are bonded by other than merely physical adsorption and/or hydrogen bonding.

As used herein, the term "epoxy group" refers to a saturated three-membered cyclic ether moiety (e.g., 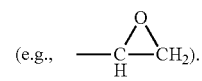).

The term 'hydrolyzable group', as used herein, denotes a group that can be hydrolyzed, which means it can react with water to provide silanol groups (Si—OH groups) that can further react with groups (e.g., hydroxyl groups) on the surfaces of the abrasive particles. The hydrolysis and condensation reactions may occur spontaneously and/or in the presence of a hydrolysis/condensation catalyst. Examples of hydrolyzable groups include" halide groups such as chlorine, bromine, iodine, or fluorine; alkoxy groups (—OR' wherein R' represents an alkyl group, preferably containing 1 to 6, more preferably 1 to 4 carbon atoms, and which may optionally be substituted by one or more halogen atoms); acyloxy groups (—O—(C=O)—R' wherein R" is as previously defined); aryloxy groups (—OR" wherein R" represents an aryl moiety), preferably containing 6 to 12, more preferably containing 6 to 10 carbon atoms, which may be optionally substituted by one or more substituents independently selected from halogens and $C_1$-$C_4$ alkyl groups which may optionally be substituted by one or more halogen atoms). In the above formulae, R', R" may include linear, branched, and/or cyclic structures.

As used herein, the term "phenolic resin" refers to a synthetic thermosetting resin obtained by the reaction of at least one phenol (e.g., phenol, resorcinol, m-cresol, 3,5-xylenol, t-butylphenol, and/or p-phenylphenol) with at least one aldehyde (e.g., formaldehyde, acetaldehyde, chloral, butyraldehyde, furfural, and/or acrolein).

As used herein, the term "polyepoxide" refers to a compound having at least two epoxy groups.

As used herein, the term "resin-bond" is equivalent to the term "resin-bonded", and is used here in accordance with common practice in the abrasive art.

Features and advantages of the present disclosure will be further understood upon consideration of the detailed description as well as the appended claims.

Figure 1:
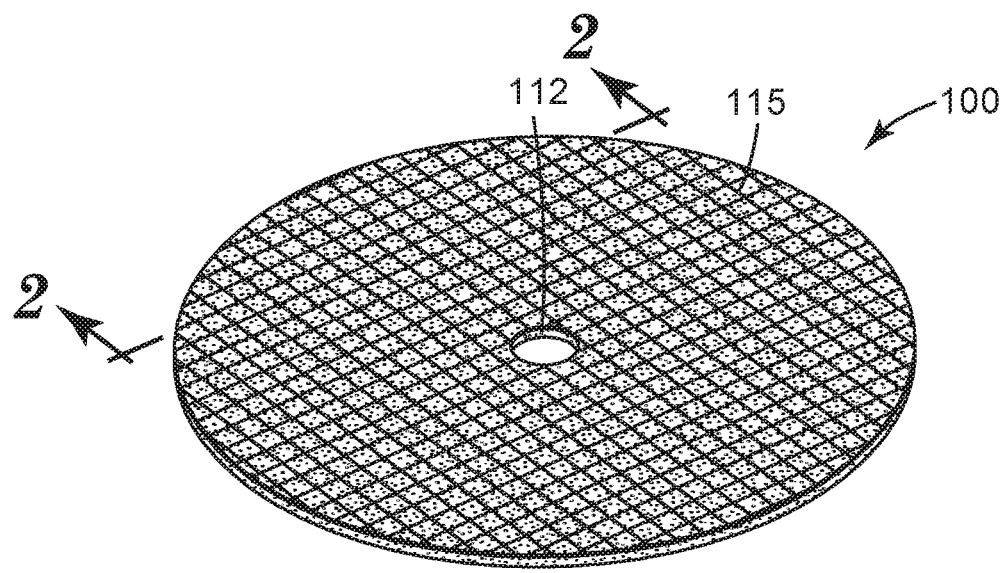
FIG. 1 is a schematic perspective view of an exemplary resin-bond abrasive cut-off wheel according to one embodiment of the present disclosure.

Repeated use of reference characters in the specification and drawings is intended to represent the same or analogous features or elements of the disclosure. It should be understood that numerous other modifications and embodiments can be devised by those skilled in the art that fall within the scope and spirit of the principles of the disclosure. The figures may not be drawn to scale.

DETAILED DESCRIPTION

Preferred adhesion promoters according to the present disclosure comprise a reaction product of a polyepoxide and an aminosilane.

Useful polyepoxides have at least two epoxy groups. For example, the polyepoxide may have at least three epoxy groups, at least four epoxy groups, at least five epoxy groups, or even at least six epoxy groups. Many polyepoxides are commercially available. Others can be readily synthesized by conventional methods.

Exemplary polyepoxides include monomeric polyepoxides, oligomeric polyepoxides, polymeric polyepoxides. Suitable polyepoxides may contain one or more glycidyl groups, be free of glycidyl groups, or contain a mixture of glycidyl and non-glycidyl epoxy groups. Useful polyepoxides may be include, for example, aromatic polyepoxides, alicyclic polyepoxides, and aliphatic polyepoxides. Mixtures of polyepoxides may also be used.

Examples of suitable polyepoxides containing glycidyl groups include bisphenol A diglycidyl ether, bisphenol F diglycidyl ether, polyglycidyl ethers of polyhydric phenols such as: Bisphenol A-type resins and their derivatives, epoxy cresol-novolac resins, epoxy phenol-novolac resins, and glycidyl esters of aromatic carboxylic acids (e.g., phthalic acid diglycidyl ester, isophthalic acid diglycidyl ester, trimellitic acid triglycidyl ester, and pyromellitic acid tetraglycidyl ester), and N,N,N',N'-tetraglycidyl-4,4'-methylenebisbenzenamine, ethylene glycol diglycidyl ether, propylene glycol diglycidyl ether, tetramethylene glycol diglycidyl ether, 1,6-hexanediol diglycidyl ether, polyethylene glycol diglycidyl ether, polypropylene glycol diglycidyl ether, polytetramethylene glycol diglycidyl ether, neopentyl glycol diglycidyl ether, trimethylolpropane triglycidyl ether, glycerol triglycidyl ether, pentaerythritol polyglycidyl ether, sorbitol polyglycidyl ether, polyglycerol polyglycidyl ether, polyglycidyl esters of polyvalent fatty acids include diglycidyl oxalate, diglycidyl maleate, diglycidyl succinate, diglycidyl glutarate, diglycidyl adipate, and diglycidyl pimelate. Examples of commercially available polyepoxides containing glycidyl groups include those having the trade designation ARALDITE (e.g., ARALDITE MY-720, ARALDITE MY-721, ARALDITE 0510, ARALDITE PY-720, and ARALDITE EPN 1179), available from Huntsman Chemical Company; those having the trade designation EPON RESIN (e.g., EPON RESIN 828, EPON RESIN 826, EPON RESIN 862 and EPON RESIN CS-377) available from Momentive Specialty Chemicals (Houston, Tex.); and aromatic polyepoxides having the trade designations DER (e.g., DER 330), and DEN (e.g., DEN 438 and DEN 439). In some preferred embodiments, the polyepoxide comprises an epoxidized novolac or resole resin. In some preferred embodiments, the polyepoxide comprises N,N-diglycidyl-4-glycidyloxyaniline.

Examples of suitable polyepoxides that are free of glycidyl groups include epoxycyclohexane carboxylates (e.g., 3,4-epoxycyclohexylmethyl 3,4-epoxycyclohexanecarboxylate (available, for example, as ERL-4221 from Dow Chemical Co., 3,4-epoxy-2-methylcyclohexylmethyl 3,4-epoxy-2-methylcyclo-hexanecarboxylate, bis(3,4-epoxy-6-methylcyclohexylmethyl) adipate, 3,4-epoxy-6-methylcyclohexylmethyl 3,4-epoxy-6-methylcyclohexanecarboxylate (available, for example, as ERL-4201 from Dow Chemical Co.); vinylcyclohexene dioxide (available, for example, as ERL-4206 from Dow Chemical Co.); bis(2,3-epoxycyclopentyl)ether (available, for example, as ERL-0400 from Dow Chemical Co.), bis(3,4-epoxy-6-methylcyclohexylmethyl) adipate (available, for example, as ERL-4289 from Dow Chemical Co.), dipenteric dioxide (available, for example, as ERL-4269 from Dow Chemical Co.), 2-(3,4-epoxycyclohexyl-5,1'-spiro-3',4'-epoxycyclohexane-1,3-dioxane, 2,2-bis(3,4-epoxycyclohexyl)propane, epoxidized polybutadiene, and epoxidized soybean oil.

Accordingly, it is suitable for use as a source of polyepoxide for practicing the present disclosure. Similarly, epoxidized derivatives of other polyunsaturated vegetable oils may also be used as sources for the polyepoxide. Examples include epoxidized linseed oil, epoxidized canola oil, epoxidized cottonseed oil, epoxidized safflower oil, and epoxidized sunflower oil.

Useful aminosilanes for making adhesion promoters according to the present disclosure are represented by the formula $$HNR^1R^2$$

wherein $R^1$ represents —Z—SiL$_3$, and $R^2$ represents —Z—SiL$_3$ or an alkyl group having from 1 to 4 carbon atoms (e.g., methyl, ethyl, propyl, or butyl).

Each Z independently represents a divalent linking group having from 1 to 12 carbon atoms. Preferred linking groups Z include: aliphatic and alicyclic groups having from 1 to 6 carbon atoms such as, for example, methylene, ethan-1,2-diyl, propan-1,2-diyl, propane-1,3-diyl, butane-1,4-diyl, and cyclohexan-1,4-diyl, —CH$_2$CH$_2$OCH$_2$CH$_2$—, —CH$_2$CH$_2$O(CH$_2$CH$_2$)$_2$—; and aromatic groups (e.g., arylene, and alkylenylarylene) such as, for example, phenylene and

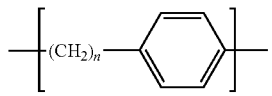

where n=1, 2, or 3.

Each L independently represents a hydrolyzable group (i.e., a group that spontaneously dissociates from the silicon atom on exposure to water). Examples of hydrolyzable groups include —Cl, —Br, —OH, —OC(=O)CH$_3$, —OCH$_3$, —OSi(CH$_3$)$_3$, and —OC$_2$H$_5$.

Exemplary useful aminosilanes include bis(triethoxysilylpropyl)amine, bis(trimethoxysilylpropyl)amine, N-methylaminopropyltrimethoxysilane, and N-methylamino-propyltris(trimethylsiloxy)silane, all available from Gelest, Morrisville, Pa., as well as N-methylaminopropyltriethoxysilane, which can be made by conventional methods.

On an average basis, no more than half of the epoxy groups of the polyepoxide are reacted with the aminosilane. In some embodiments, from one to three epoxy groups of the polyepoxide are reacted with the aminosilane. In some embodiments, one or two epoxy groups of the polyepoxide is reacted with the aminosilane.

In general, simple mixing with optional mild heating is sufficient to the aminosilane with the polyepoxide to form the adhesion promoter. If desired, the reaction may be carried out in an organic solvent or under solventless conditions.

Some sterically hindered or substituted aminosilanes and polyepoxides may need higher reaction temperatures to form the adhesion promoter due to their lower reactivity. In this case, a blend of unreacted aminosilane and polyepoxide can be applied on substrates, and then the actual adhesion promoter can be generated in situ during further processing steps (e.g. resin curing) at high temperatures.

Preferably the stoichiometry on aminosilane to epoxy groups is about 1:1 on an equivalent basis, although lesser and greater ratios may be also used.

After condensation of the aminosilane with the polyepoxide, a hydroxyl group is generated that is capped by reaction with the isocyanate group of the isocyanatosilane, optionally in the presence of a urethane condensation catalyst such as, for example, dibutyltin dilaurate.

The isocyanatosilane reacts with the hydroxyl group to form a urethane linkage, thereby stabilizing the adhesion promoter. Useful isocyanatosilanes are represented by the formula $$O=C=N-Z-SiL_3$$

wherein Z and L are as defined previously herein. Many isocyanatosilanes are commercially available. Others can be readily synthesized by conventional methods. Preferred isocyanatosilanes include 3-isocyanatopropyltrimethoxysilane, 3-isocyanatopropyltriethoxysilane, 2-isocyanatoethyltrimethoxysilane, and 2-isocyanatoethyltriethoxysilane. Combinations of isocyanatosilanes may also be used.

Combinations of more than one adhesion promoter according to the present disclosure may be used. For some applications, it may be desirable to further include conventional coupling agents with the adhesion promoter(s) described hereinabove.

The adhesion promoter is useful for treating the surface of a substrate such that it can react with a precursor binder material and serve the function of a coupling agent for epoxy-resin-reactive precursor binder systems (e.g., phenolic resins, epoxy resins, aminoplast resins, two-part polyurethanes, polyisocyanates, and hydroxy- or amino-function acrylic resins) and result in a bonded abrasive article with improve anchoring of the abrasive particles under at least some abrading conditions. Typically, this can be accomplished under solvent-free conditions by simply applying the adhesion promoter to the substrate; however, solvent may be used if desired, for example, to achieve very low coating weight.

Referring now to FIG. 1, exemplary resin-bond abrasive cut-off wheel 100 according to one embodiment of the present disclosure has center hole 112 used for attaching cut-off wheel 100 to, for example, a power-driven tool (not shown). Cut-off wheel 100 includes optional abrasive particles 20 (e.g., shaped and/or crushed abrasive particles surface-treated with epoxy-functional aminosilane coupling agent according to the present disclosure) and/or optional conventionally crushed and sized abrasive particles 30, and resin-bond 25.

Figure 2:
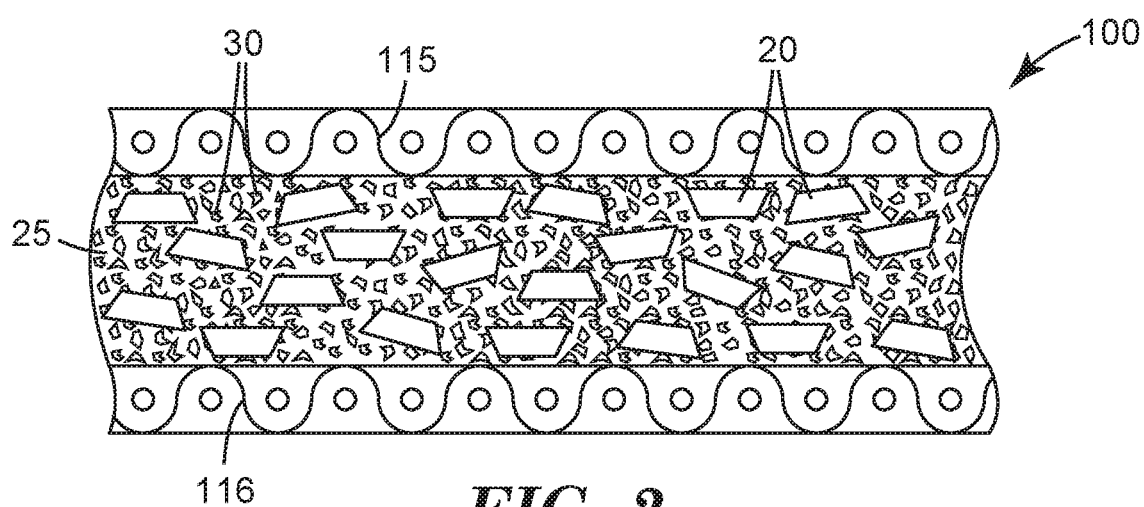
FIG. 2 is a schematic cross-sectional side view of exemplary resin-bond abrasive cut-off wheel shown in FIG. 1 taken along line 2-2.

Referring now to FIG. 2, cut-off wheel 100 includes optional abrasive particles (e.g., shaped and/or crushed abrasive particles) 20 and/or optional conventionally-crushed abrasive particles 30, and binder material 25. Cut-off wheel 100 has optional first scrim 115 and optional second scrim 116, which are disposed on opposed major surfaces of cut-off wheel 100.

Resin-bond abrasive articles (e.g., grinding wheels and cut-off wheels) according to the present disclosure are generally made by a molding process. During molding, a precursor binder material, either liquid organic, powdered inorganic, powdered organic, or a combination of thereof, is mixed with the abrasive particles. In some instances, a liquid medium (either resin or a solvent) is first applied to the abrasive particles to wet their outer surface, and then the wetted particles are mixed with a powdered medium. Resin-bond abrasive articles (e.g., abrasive wheels) according to the present disclosure may be made by compression molding, injection molding, transfer molding, or the like. The molding can be done either by hot or cold pressing or any suitable manner known to those skilled in the art.

The resin-bond comprises one or more organic binder materials. Organic binder materials are typically included in an amount of from 5 to 30 percent, more typically 10 to 25, and more typically 15 to 24 percent by weight, based of the total weight of the resin-bond abrasive wheel. Phenolic resin is the most commonly used organic binder material, and may be used in both the powder form and liquid state. Although phenolic resins are widely used, it is within the scope of this disclosure to use other organic binder materials including, for example, urea-formaldehyde resins, aminoplasts, and acrylic resins. The organic binder material may also be modified with other binder materials to improve or alter the properties of the binder material.

Catalysts and/or initiators may be added to precursor organic binder materials (i.e., material that cure to form the binder material) depending on the desired organic binder material. Typically, heat is applied to advance curing of the precursor organic binder materials; however, other sources of energy (e.g., microwave radiation, ultraviolet light, visible light) may also be used. The specific curatives and amounts used will be apparent to those skilled in the art.

Useful phenolic resins include novolac and resole phenolic resins. Novolac phenolic resins are characterized by being acid-catalyzed and having a ratio of formaldehyde to phenol of less than one, typically between 0.5:1 and 0.8:1. Resole phenolic resins are characterized by being alkaline catalyzed and having a ratio of formaldehyde to phenol of greater than or equal to one, typically from 1:1 to 3:1. Novolac and resole phenolic resins may be chemically modified (e.g., by reaction with epoxy compounds), or they may be unmodified. Exemplary acidic catalysts suitable for curing phenolic resins include sulfuric, hydrochloric, phosphoric, oxalic, and p-toluenesulfonic acids. Alkaline catalysts suitable for curing phenolic resins include sodium hydroxide, barium hydroxide, potassium hydroxide, calcium hydroxide, organic amines, or sodium carbonate.

Phenolic resins are well-known and readily available from commercial sources. Examples of commercially available novolac resins include DUREZ 1364, a two-step, powdered phenolic resin (marketed by Durez Corporation of Addison, Tex. under the trade designation VARCUM (e.g., 29302)), or HEXION AD5534 RESIN (marketed by Hexion Specialty Chemicals, Inc. of Louisville, Ky.). Examples of commercially available resole phenolic resins useful in practice of the present disclosure include those marketed by Durez Corporation under the trade designation VARCUM (e.g., 29217, 29306, 29318, 29338, 29353); those marketed by Ashland Chemical Co. of Bartow, Fla. under the trade designation AEROFENE (e.g., AEROFENE 295); and those marketed by Kangnam Chemical Company Ltd. of Seoul, South Korea under the trade designation "PHENOLITE" (e.g., PHENOLITE TD-2207).

Curing temperatures of organic precursor binder materials will vary with the material chosen and wheel design. Selection of suitable conditions is within the capability of one of ordinary skill in the art. Exemplary conditions for a phenolic binder may include an applied pressure of about 20 tons per 4 inches diameter (244 kg/cm$^2$) at room temperature followed by heating at temperatures up to about 185° C. for sufficient time to cure the organic precursor binder material.

In some embodiments, the resin-bond abrasive wheels include from about 10 to about 80 percent by weight of abrasive particles (e.g., shaped and/or crushed abrasive particles); typically 30 to 60 percent by weight, and more typically 40 to 60 percent by weight, based on the total weight of the binder material and abrasive particles.

Abrasive particles (e.g., shaped and/or crushed abrasive particles) composed of crystallites of alpha alumina, magnesium alumina spinel, and a rare earth hexagonal aluminate may be prepared using sol-gel precursor alpha alumina particles according to methods described in, for example, U.S. Pat. No. 5,213,591 (Celikkaya et al.) and U. S. Publ. Patent Appln. Nos. 2009/0165394 A1 (Culler et al.) and 2009/0169816 A1 (Erickson et al.).

In some embodiments, alpha alumina based abrasive particles (e.g., shaped abrasive particles) can be made according to a multistep process. Briefly, the method comprises the steps of making either a seeded or non-seeded sol-gel alpha alumina precursor dispersion that can be converted into alpha alumina; filling one or more mold cavities having the desired outer shape of the shaped abrasive particle with the sol-gel, drying the sol-gel to form precursor abrasive particles; removing the precursor shaped abrasive particles from the mold cavities; calcining the precursor shaped abrasive particles to form calcined, precursor shaped abrasive particles, and then sintering the calcined, precursor shaped abrasive particles to form shaped abrasive particles. The process will now be described in greater detail.

The first process step involves providing either a seeded or non-seeded dispersion of an alpha alumina precursor that can be converted into alpha alumina. The alpha alumina precursor dispersion often comprises a liquid that is a volatile component. In one embodiment, the volatile component is water. The dispersion should comprise a sufficient amount of liquid for the viscosity of the dispersion to be sufficiently low to enable filling mold cavities and replicating the mold surfaces, but not so much liquid as to cause subsequent removal of the liquid from the mold cavity to be prohibitively expensive. In one embodiment, the alpha alumina precursor dispersion comprises from 2 percent to 90 percent by weight of the particles that can be converted into alpha alumina, such as particles of aluminum oxide monohydrate (boehmite), and at least 10 percent by weight, or from 50 percent to 70 percent, or 50 percent to 60 percent, by weight of the volatile component such as water. Conversely, the alpha alumina precursor dispersion in some embodiments contains from 30 percent to 50 percent, or 40 percent to 50 percent, by weight solids.

Aluminum oxide hydrates other than boehmite can also be used. Boehmite can be prepared by known techniques or can be obtained commercially. Examples of commercially available boehmite include products having the trade designations DISPERAL, and DISPAL, both available from Sasol North America, Inc. of Houston, Tex., or HiQ-40 available from BASF Corporation of Florham Park, N.J. These aluminum oxide monohydrates are relatively pure; that is, they include relatively little, if any, hydrate phases other than monohydrates, and have a high surface area.

The physical properties of the resulting shaped abrasive particles will generally depend upon the type of material used in the alpha alumina precursor dispersion. In one embodiment, the alpha alumina precursor dispersion is in a gel state. As used herein, a "gel" is a three-dimensional network of solids dispersed in a liquid.

The alpha alumina precursor dispersion may contain a modifying additive or precursor of a modifying additive. The modifying additive can function to enhance some desirable property of the abrasive particles or increase the effectiveness of the subsequent sintering step. Modifying additives or precursors of modifying additives can be in the form of soluble salts, typically water soluble salts. They typically consist of a metal-containing compound and can be a precursor of oxide of magnesium, zinc, iron, silicon, cobalt, nickel, zirconium, hafnium, chromium, yttrium, praseodymium, samarium, ytterbium, neodymium, lanthanum, gadolinium, cerium, dysprosium, erbium, titanium, and mixtures thereof. The particular concentrations of these additives that can be present in the alpha alumina precursor dispersion can be varied based on skill in the art.

Typically, the introduction of a modifying additive or precursor of a modifying additive will cause the alpha alumina precursor dispersion to gel. The alpha alumina precursor dispersion can also be induced to gel by application of heat over a period of time. The alpha alumina precursor dispersion can also contain a nucleating agent (seeding) to enhance the transformation of hydrated or calcined aluminum oxide to alpha alumina. Nucleating agents suitable for this disclosure include fine particles of alpha alumina, alpha ferric oxide or its precursor, titanium oxides and titanates, chrome oxides, or any other material that will nucleate the transformation. The amount of nucleating agent, if used, should be sufficient to effect the transformation of alpha alumina. Nucleating such alpha alumina precursor dispersions is disclosed in U.S. Pat. No. 4,744,802 (Schwabel).

A peptizing agent can be added to the alpha alumina precursor dispersion to produce a more stable hydrosol or colloidal alpha alumina precursor dispersion. Suitable peptizing agents are monoprotic acids or acid compounds such as acetic acid, hydrochloric acid, formic acid, and nitric acid. Multiprotic acids can also be used but they can rapidly gel the alpha alumina precursor dispersion, making it difficult to handle or to introduce additional components thereto. Some commercial sources of boehmite contain an acid titer (such as absorbed formic or nitric acid) that will assist in forming a stable alpha alumina precursor dispersion.

The alpha alumina precursor dispersion can be formed by any suitable means, such as, for example, by simply mixing aluminum oxide monohydrate with water containing a peptizing agent or by forming an aluminum oxide monohydrate slurry to which the peptizing agent is added.

Defoamers or other suitable chemicals can be added to reduce the tendency to form bubbles or entrain air while mixing. Additional chemicals such as wetting agents, alcohols, or coupling agents can be added if desired. The alpha alumina abrasive particles may contain silica and iron oxide as disclosed in U.S. Pat. No. 5,645,619 (Erickson et al.). The alpha alumina abrasive particles may contain zirconia as disclosed in U.S. Pat. No. 5,551,963 (Larmie). Alternatively, the alpha alumina abrasive particles can have a microstructure or additives as disclosed in U.S. Pat. No. 6,277,161 (Castro).

The second process step involves providing a mold having at least one mold cavity, and preferably a plurality of cavities. The mold can have a generally planar bottom surface and a plurality of mold cavities. The plurality of cavities can be formed in a production tool. The production tool can be a belt, a sheet, a continuous web, a coating roll such as a rotogravure roll, a sleeve mounted on a coating roll, or die. In one embodiment, the production tool comprises polymeric material. Examples of suitable polymeric materials include thermoplastics such as polyesters, polycarbonates, poly(ether sulfone), poly(methyl methacrylate), polyurethanes, polyvinylchloride, polyolefin, polystyrene, polypropylene, polyethylene or combinations thereof, or thermosetting materials. In one embodiment, the entire tooling is made from a polymeric or thermoplastic material. In another embodiment, the surfaces of the tooling in contact with the sol-gel while drying, such as the surfaces of the plurality of cavities, comprises polymeric or thermoplastic materials and other portions of the tooling can be made from other materials. A suitable polymeric coating may be applied to a metal tooling to change its surface tension properties by way of example.

A polymeric or thermoplastic tool can be replicated off a metal master tool. The master tool will have the inverse pattern desired for the production tool. The master tool can be made in the same manner as the production tool. In one embodiment, the master tool is made out of metal, e.g., nickel and is diamond turned. The polymeric sheet material can be heated along with the master tool such that the polymeric material is embossed with the master tool pattern by pressing the two together. A polymeric or thermoplastic material can also be extruded or cast onto the master tool and then pressed. The thermoplastic material is cooled to solidify and produce the production tool. If a thermoplastic production tool is utilized, then care should be taken not to generate excessive heat that may distort the thermoplastic production tool limiting its life. More information concerning the design and fabrication of production tooling or master tools can be found in U.S. Pat. No. 5,152,917 (Pieper et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.).

Access to cavities can be from an opening in the top surface or bottom surface of the mold. In some instances, the cavities can extend for the entire thickness of the mold. Alternatively, the cavities can extend only for a portion of the thickness of the mold. In one embodiment, the top surface is substantially parallel to bottom surface of the mold with the cavities having a substantially uniform depth. At least one side of the mold, that is, the side in which the cavities are formed, can remain exposed to the surrounding atmosphere during the step in which the volatile component is removed.

The cavities have a specified three-dimensional shape to make the shaped abrasive particles. The depth dimension is equal to the perpendicular distance from the top surface to the lowermost point on the bottom surface. The depth of a given cavity can be uniform or can vary along its length and/or width. The cavities of a given mold can be of the same shape or of different shapes.

The third process step involves filling the cavities in the mold with the alpha alumina precursor dispersion (e.g., by a conventional technique). In some embodiments, a knife roll coater or vacuum slot die coater can be used. A mold release can be used to aid in removing the particles from the mold if desired. Typical mold release agents include oils such as peanut oil or mineral oil, fish oil, silicones, polytetrafluoroethylene, zinc stearate, and graphite. In general, mold release agent such as peanut oil, in a liquid, such as water or alcohol, is applied to the surfaces of the production tooling in contact with the sol-gel such that between about 0.1 mg/in$^2$ (0.02 mg/cm$^2$) to about 3.0 mg/in$^2$ (0.46 mg/cm$^2$), or between about 0.1 mg/in$^2$ (0.02 mg/cm$^2$) to about 5.0 mg/in$^2$ (0.78 mg/cm$^2$) of the mold release agent is present per unit area of the mold when a mold release is desired. In some embodiments, the top surface of the mold is coated with the alpha alumina precursor dispersion. The alpha alumina precursor dispersion can be pumped onto the top surface.

Next, a scraper or leveler bar can be used to force the alpha alumina precursor dispersion fully into the cavity of the mold. The remaining portion of the alpha alumina precursor dispersion that does not enter cavity can be removed from top surface of the mold and recycled. In some embodiments, a small portion of the alpha alumina precursor dispersion can remain on the top surface and in other embodiments the top surface is substantially free of the dispersion. The pressure applied by the scraper or leveler bar is typically less than 100 psi (0.7 MPa), less than 50 psi (0.3 MPa), or even less than 10 psi (69 kPa). In some embodiments, no exposed surface of the alpha alumina precursor dispersion extends substantially beyond the top surface to ensure uniformity in thickness of the resulting shaped abrasive particles.

The fourth process step involves removing the volatile component to dry the dispersion. Desirably, the volatile component is removed by fast evaporation rates. In some embodiments, removal of the volatile component by evaporation occurs at temperatures above the boiling point of the volatile component. An upper limit to the drying temperature often depends on the material the mold is made from. For polypropylene tooling the temperature should be less than the melting point of the plastic. In one embodiment, for a water dispersion of between about 40 to 50 percent solids and a polypropylene mold, the drying temperatures can be between about 90° C. to about 165° C., or between about 105° C. to about 150° C., or between about 105° C. to about 120° C. Higher temperatures can lead to improved production speeds but can also lead to degradation of the polypropylene tooling limiting its useful life as a mold.

The fifth process step involves removing resultant precursor shaped abrasive particles with from the mold cavities. The precursor shaped abrasive particles can be removed from the cavities by using the following processes alone or in combination on the mold: gravity, vibration, ultrasonic vibration, vacuum, or pressurized air to remove the particles from the mold cavities.

The precursor abrasive particles can be further dried outside of the mold. If the alpha alumina precursor dispersion is dried to the desired level in the mold, this additional drying step is not necessary. However, in some instances it may be economical to employ this additional drying step to minimize the time that the alpha alumina precursor dispersion resides in the mold. Typically, the precursor shaped abrasive particles will be dried from 10 to 480 minutes, or from 120 to 400 minutes, at a temperature from 50° C. to 160° C., or at 120° C. to 150° C.

The sixth process step involves calcining the precursor shaped abrasive particles. During calcining, essentially all the volatile material is removed, and the various components that were present in the alpha alumina precursor dispersion are transformed into metal oxides. The precursor shaped abrasive particles are generally heated to a temperature from 400° C. to 800° C., and maintained within this temperature range until the free water and over 90 percent by weight of any bound volatile material are removed. In an optional step, it may be desired to introduce the modifying additive by an impregnation process. A water-soluble salt can be introduced by impregnation into the pores of the calcined, precursor shaped abrasive particles. Then the precursor shaped abrasive particles are pre-fired again. This option is further described in U.S. Pat. No. 5,164,348 (Wood).

The seventh process step involves sintering the calcined, precursor shaped abrasive particles to form alpha alumina particles. Prior to sintering, the calcined, precursor shaped abrasive particles are not completely densified and thus lack the desired hardness to be used as shaped abrasive particles. Sintering takes place by heating the calcined, precursor shaped abrasive particles to a temperature of from 1000° C. to 1650° C. and maintaining them within this temperature range until substantially all of the alpha alumina monohydrate (or equivalent) is converted to alpha alumina and the porosity is reduced to less than 15 percent by volume. The length of time to which the calcined, precursor shaped abrasive particles must be exposed to the sintering temperature to achieve this level of conversion depends upon various factors but usually from five seconds to 48 hours is typical.

In another embodiment, the duration for the sintering step ranges from one minute to 90 minutes. After sintering, the shaped abrasive particles can have a Vickers hardness of 10 GPa, 16 GPa, 18 GPa, 20 GPa, or greater.

Other steps can be used to modify the described process such as, for example, rapidly heating the material from the calcining temperature to the sintering temperature, centrifuging the alpha alumina precursor dispersion to remove sludge and/or waste. Moreover, the process can be modified by combining two or more of the process steps if desired. Conventional process steps that can be used to modify the process of this disclosure are more fully described in U.S. Pat. No. 4,314,827 (Leitheiser).

More information concerning methods to make shaped abrasive particles is disclosed in U.S. Publ. Patent Appln. No. 2009/0165394 A1 (Culler et al.).

Shaped abrasive particles are preferably made using tools (i.e., molds) cut using diamond tooling, which provides higher feature definition than other fabrication alternatives such as, for example, stamping or punching. Typically, the cavities in the tool surface have planar faces that meet along sharp edges, and form the sides and top of a truncated pyramid. The resultant shaped abrasive particles have a respective nominal average shape that corresponds to the shape of cavities (e.g., truncated pyramid) in the tool surface; however, variations (e.g., random variations) from the nominal average shape may occur during manufacture, and shaped abrasive particles exhibiting such variations are included within the definition of shaped abrasive particles as used herein.

Preferably, the base and the top of the shaped abrasive particles are substantially parallel, resulting in prismatic or truncated pyramidal shapes, and the dihedral angle between the base and each of the sides may independently range from 45 to 90 degrees, typically 70 to 90 degrees, more typically 75 to 85 degrees, although these are not requirements.

As used herein in referring to shaped abrasive particles, the term "length" refers to the maximum dimension of a shaped abrasive particle. "Width" refers to the maximum dimension of the shaped abrasive particle that is perpendicular to the length. "Thickness" or "height" refer to the dimension of the shaped abrasive particle that is perpendicular to the length and width.

Shaped abrasive particles are typically selected to have a length in a range of from 0.001 mm to 26 mm, more typically 0.1 mm to 10 mm, and more typically 0.5 mm to 5 mm, although other lengths may also be used. In some embodiments, the length may be expressed as a fraction of the thickness of the resin-bond abrasive article (e.g., wheel) in which it is contained. For example, the shaped abrasive particle may have a length greater than half the thickness of the resin-bond abrasive wheel. In some embodiments, the length of the shaped abrasive particles may be greater than the thickness of the resin-bond abrasive wheel.

Shaped abrasive particles are typically selected to have a width in a range of from 0.001 mm to 26 mm, more typically 0.1 mm to 10 mm, and more typically 0.5 mm to 5 mm, although other lengths may also be used. Shaped abrasive particles are typically selected to have a thickness in a range of from 0.005 mm to 1.6 mm, more typically, from 0.2 to 1.2 mm. In some embodiments, shaped abrasive particles may have an aspect ratio (length to thickness) of at least 2, 3, 4, 5, 6, or more.

Surface coatings on the abrasive particles may be used to improve the adhesion between the abrasive particles and a binder material in abrasive articles, or can be used to aid in electrostatic deposition of the abrasive particles. In one embodiment, surface coatings as described in U.S. Pat. No. 5,352,254 (Celikkaya) in an amount of 0.1 to 2 percent surface coating to shaped abrasive particle weight may be used. Such surface coatings are described in U.S. Pat. No. 5,213,591 (Celikkaya et al.); U.S. Pat. No. 5,011,508 (Wald et al.); U.S. Pat. No. 1,910,444 (Nicholson); U.S. Pat. No. 3,041,156 (Rowse et al.); U.S. Pat. No. 5,009,675 (Kunz et al.); U.S. Pat. No. 5,085,671 (Martin et al.); U.S. Pat. No. 4,997,461 (Markhoff-Matheny et al.); and U.S. Pat. No. 5,042,991 (Kunz et al.). Additionally, the surface coating may prevent the abrasive particles from capping. "Capping" is a term used to describe the phenomenon where metal particles from the workpiece being abraded become welded to the tops of the shaped abrasive particles. Surface coatings to perform the above functions are known to those of skill in the art.

Adhesion promoters according to the present disclosure are especially useful for treating the surface of an abrasive particle (e.g., as described hereinbelow), such that it can react with a precursor binder material, and result in a bonded, coated or nonwoven abrasive article with improved anchoring of the abrasive particles under at least some abrading conditions. Typically, this can be accomplished under solvent-free conditions by simply applying the adhesion promoter to the abrasive particle; however, solvent may be used if desired.

The amount of adhesion promoter that should be added to the surface of the abrasive particles will generally depend to a degree on their surface area. Preferably, it is added at a level that results in monolayer coverage of the surface of the abrasive particles; however, this is not a requirement. In some embodiments, the amount of the adhesion promoter that is added to the abrasive particles is less than or equal to 0.005 wt. percent, preferably less than or equal to 0.003 wt. percent, and more preferably less than or equal to 0.002 wt. percent, based on the total weight of abrasive particles and adhesion promoter.

Reaction of the adhesion promoter with the abrasive particle is preferably carried out under conditions such that the hydrolyzable groups are removed by hydrolysis and then condensed with the abrasive particle at its surface to form 1, 2, or preferably 3 covalent bonds, thereby anchoring the isocyanato (i.e., O=C=N—) group firmly to the abrasive particle. Conditions for carrying out such reactions are well-known to those of skill in the art. In some cases, simple mixing may be sufficient. Preferably, the adhesion promoter is combined with the abrasive particles in sufficient amount that substantially the entire surface of the abrasive particles becomes modified by reaction with the isocyanate-functional organosilane, although this is not a requirement. For example, the adhesion promoter may be used in an amount of 0.01 to 3 parts by weight, preferably 0.1 to 0.3 parts by weight, for every 100 parts by weight of abrasive particles, although amounts outside this range may also be used.

The resin-bond abrasive articles may comprise crushed abrasive particles, shaped abrasive particles or a combination thereof. If shaped abrasive particles and crushed abrasive particles are both used, the crushed abrasive particles are typically of a finer size grade or grades (e.g., if a plurality of size grades are used) than the shaped abrasive particles, although this is not a requirement.

Useful crushed abrasive particles include, for example, crushed particles of fused aluminum oxide, heat treated aluminum oxide, white fused aluminum oxide, ceramic aluminum oxide materials such as those commercially available under the trade designation 3M CERAMIC ABRASIVE GRAIN from 3M Company of St. Paul, Minn., black silicon carbide, green silicon carbide, titanium diboride, boron carbide, tungsten carbide, titanium carbide, diamond, cubic boron nitride, garnet, fused alumina zirconia, sol-gel derived abrasive particles, iron oxide, chromia, ceria, zirconia, titania, silicates, tin oxide, silica (such as quartz, glass beads, glass bubbles and glass fibers), silicates (such as talc, clays (e.g., montmorillonite), feldspar, mica, calcium silicate, calcium metasilicate, sodium aluminosilicate, sodium silicate), flint, and emery. Examples of sol-gel derived abrasive particles can be found in U.S. Pat. No. 4,314,827 (Leitheiser et al.), U.S. Pat. No. 4,623,364 (Cottringer et al.), U.S. Pat. No. 4,744,802 (Schwabel), U.S. Pat. No. 4,770,671 (Monroe et al.), and U.S. Pat. No. 4,881,951 (Monroe et al.). It is also contemplated that the abrasive particles could comprise abrasive agglomerates such, for example, as those described in U.S. Pat. No. 4,652,275 (Bloecher et al.) or U.S. Pat. No. 4,799,939 (Bloecher et al.).

Typically, crushed abrasive particles are independently sized according to an abrasives industry recognized specified nominal grade. Exemplary abrasive industry recognized grading standards include those promulgated by ANSI (American National Standards Institute), FEPA (Federation of European Producers of Abrasives), and JIS (Japanese Industrial Standard). Such industry accepted grading standards include, for example: ANSI 4, ANSI 6, ANSI 8, ANSI 16, ANSI 24, ANSI 30, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600; FEPA P8, FEPA P12, FEPA P16, FEPA P24, FEPA P30, FEPA P36, FEPA P40, FEPA P50, FEPA P60, FEPA P80, FEPA P100, FEPA P120, FEPA P150, FEPA P180, FEPA P220, FEPA P320, FEPA P400, FEPA P500, FEPA P600, FEPA P800, FEPA P1000, FEPA P1200; FEPA F8, FEPA F12, FEPA F16, and FEPA F24; and JIS 8, JIS 12, JIS 16, JIS 24, JIS 36, JIS 46, JIS 54, JIS 60, JIS 80, JIS 100, JIS 150, JIS 180, JIS 220, JIS 240, JIS 280, JIS 320, JIS 360, JIS 400, JIS 400, JIS 600, JIS 800, JIS 1000, JIS 1500, JIS 2500, JIS 4000, JIS 6000, JIS 8000, and JIS 10,000. More typically, the crushed aluminum oxide particles and the non-seeded sol-gel derived alumina-based abrasive particles are independently sized to ANSI 60 and 80, or FEPA F36, F46, F54 and F60 or FEPA P60 and P80 grading standards.

Alternatively, the abrasive particles can be graded to a nominal screened grade using U.S.A. Standard Test Sieves conforming to ASTM E-11 "Standard Specification for Wire Cloth and Sieves for Testing Purposes". ASTM E-11 prescribes the requirements for the design and construction of testing sieves using a medium of woven wire cloth mounted in a frame for the classification of materials according to a designated particle size. A typical designation may be represented as −18+20 meaning that the shaped abrasive particles pass through a test sieve meeting ASTM E-11 specifications for the number 18 sieve and are retained on a test sieve meeting ASTM E-11 specifications for the number 20 sieve. In one embodiment, the shaped abrasive particles have a particle size such that most of the particles pass through an 18 mesh test sieve and can be retained on a 20, 25, 30, 35, 40, 45, or 50 mesh test sieve. In various embodiments, the shaped abrasive particles can have a nominal screened grade comprising: −18+20, −20/+25, −25+30, −30+35, −35+40, −40+45, −45+50, −50+60, −60+70, −70/+80, −80+100, −100+120, −120+140, −140+170, −170+200, −200+230, −230+270, −270+325, −325+400, −400+450, −450+500, or −500+635. Alternatively, a custom mesh size could be used such as −90+100.

The abrasive particles may, for example, be uniformly or non-uniformly distributed throughout the resin-bond abrasive article. For example, if the resin-bond abrasive wheel is a grinding wheel or a cut-off wheel, the abrasive particles may be concentrated toward the middle (e.g., located away from the outer faces of a grinding or cut-off wheel), or only in the outer edge, i.e., the periphery, of a grinding or cut-off wheel. The center portion may contain a lesser amount of abrasive particles. In another variation, first abrasive particles may be in one side of the wheel with different abrasive particles on the opposite side. However, typically all the abrasive particles are homogenously distributed among each other, because the manufacture of the wheels is easier.

Resin-bond abrasive wheels according to the present disclosure may comprise additional abrasive particles beyond those mentioned above, subject to weight range requirements of the other constituents being met. Examples include fused aluminum oxide (including fused alumina-zirconia), brown aluminum oxide, blue aluminum oxide, silicon carbide (including green silicon carbide), garnet, diamond, cubic boron nitride, boron carbide, chromia, ceria, and combinations thereof.

At least some of the abrasive particles are surface-treated with an adhesion promoter according to the present disclosure to enhance adhesion of the abrasive particles to the binder material. The abrasive particles may be treated before combining them with the precursor binder material, or they may be surface-modified in situ by including the adhesion promoter in the precursor binder material.

In some embodiments, resin-bond abrasive wheels according to the present disclosure contain additional grinding aids such as, for example, polytetrafluoroethylene particles, cryolite, sodium chloride, $FeS_2$ (iron disulfide), or $KBF_4$; typically, in amounts of from 1 to 25 percent by weight, more typically 10 to 20 percent by weight, subject to weight range requirements of the other constituents being met. Grinding aids are added to improve the cutting characteristics of the cut-off wheel, generally by reducing the temperature of the cutting interface. The grinding aid may be in the form of single particles or an agglomerate of grinding aid particles. Examples of precisely shaped grinding aid particles are taught in U.S. Patent Publ. No. 2002/0026752 A1 (Culler et al.).

In some embodiments, the binder material contains plasticizer such as, for example, that available as SANTICIZER 154 PLASTICIZER from UNIVAR USA, Inc. of Chicago, Ill.

Resin-bond abrasive articles according to the present disclosure may contain additional components such as, for example, filler particles, subject to weight range requirements of the other constituents being met. Filler particles may be added to occupy space and/or provide porosity. Porosity enables the resin-bond abrasive article to shed used or worn abrasive particles to expose new or fresh abrasive particles.

Resin-bond abrasive articles (e.g., wheels) according to the present disclosure have any range of porosity; for example, from about 1 percent to 50 percent, typically 1 percent to 40 percent by volume. Examples of fillers include bubbles and beads (e.g., glass, ceramic (alumina), clay, polymeric, metal), cork, gypsum, marble, limestone, flint, silica, aluminum silicate, and combinations thereof.

Resin-bond abrasive articles (e.g., wheels) according to the present disclosure can be made according to any suitable method. In one suitable method, the non-seeded sol-gel derived alumina-based abrasive particles are coated with a coupling agent prior to mixing with the curable resole phenolic. The amount of adhesion promoter is generally selected to be in an effective amount. For example, the epoxy-functional silane the such that it is present in an amount of 0.01 to 3 parts, preferably 0.1 to 0.3, for every 100 parts of abrasive particles, although amounts outside this range may also be used. To the resulting mixture is added the liquid resin, as well as the curable novolac phenolic resin and the cryolite. The mixture is pressed into a mold (e.g., at an applied pressure of 20 tons per 4 inches diameter (244 $kg/cm^2$) at room temperature. The molded wheel is then cured by heating at temperatures up to about 185° C. for sufficient time to cure the curable phenolic resins.

Resin-bond abrasive wheels according to the present disclosure are useful, for example, as cut-off wheels and abrasives industry Type 27 (e.g., as in American National Standards Institute standard ANSI B7.1-2000 (2000) in section 1.4.14) depressed-center grinding wheels.

Cut-off wheels are typically 0.80 millimeter (mm) to 16 mm in thickness, more typically 1 mm to 8 mm, and typically have a diameter between 2.5 cm and 100 cm (40 inches), more typically between about 7 cm and 13 cm, although other dimensions may also be used (e.g., wheels as large as 100 cm in diameter are known). An optional center hole may be used to attaching the cut-off wheel to a power-driven tool. If present, the center hole is typically 0.5 cm to 2.5 cm in diameter, although other sizes may be used. The optional center hole may be reinforced; for example, by a metal flange. Alternatively, a mechanical fastener may be axially secured to one surface of the cut-off wheel. Examples include threaded posts, threaded nuts, Tinnerman nuts, and bayonet mount posts.

Optionally, resin-bond abrasive wheels, especially cut-off wheels, according to the present disclosure may further comprise a scrim and/or backing that reinforces the resin-bond abrasive wheel; for example, disposed on one or two major surfaces of the resin-bond abrasive wheel, or disposed within the resin-bond abrasive wheel. Examples include paper, polymeric film, metal foil, vulcanized fiber, synthetic fiber and/or natural fiber nonwovens (e.g., lofty open nonwoven synthetic fiber webs and meltspun scrims), synthetic and/or natural fiber knits, synthetic fiber and/or natural fiber wovens (e.g., woven glass fabrics/scrims, woven polyester fabrics, treated versions thereof, and combinations thereof). Examples of suitable porous reinforcing scrims include porous fiberglass scrims and porous polymeric scrims (e.g., comprising polyolefin, polyamide, polyester, cellulose acetate, polyimide, and/or polyurethane) which may be melt-spun, melt blown, wet-laid, or air-laid, for example. In some instances, it may be desirable to include reinforcing staple fibers within the bonding medium, so that the fibers are homogeneously dispersed throughout the cut-off wheel.

The selection of porosity and basis weight of the various reinforcing members (e.g., scrims and backings) described herein are within the capability of those skilled in the abrasives art, and typically depend on the intended use.

Resin-bond abrasive wheels according to the present disclosure are useful, for example, for abrading a workpiece. For example, they may be formed into grinding or cut-off wheels that exhibit good grinding characteristics while maintaining a relatively low operating temperature that may avoid thermal damage to the workpiece.

Cut-off wheels can be used on any right angle grinding tool such as, for example, those available from Ingersoll-Rand, Sioux, Milwaukee, and Dotco. The tool can be electrically or pneumatically driven, generally at speeds from about 1000 to 50000 RPM.

During use, the resin-bond abrasive wheel can be used dry or wet. During wet grinding, the wheel is used in conjunction with water, oil-based lubricants, or water-based lubricants. Resin-bond abrasive wheels according to the present disclosure may be particularly useful on various workpiece materials such as, for example, carbon steel sheet or bar stock and more exotic metals (e.g., stainless steel or titanium), or on softer more ferrous metals (e.g., mild steel, low alloy steels, or cast irons).

SELECT EMBODIMENTS OF THE PRESENT DISCLOSURE

In a first embodiment, the present disclosure provides an adhesion promoter comprising at least one ring-opened adduct of:
a) a polyepoxide having at least two epoxy groups;
b) an aminosilane represented by the formula

HNR$^1$R$^2$ wherein R$^1$ and R$^2$ independently represent —Z—SiL$_3$, wherein each Z independently represents a divalent linking group having from 1 to 12 carbon atoms, and wherein each L independently represents a hydrolyzable group, and
c) an isocyanatosilane represented by the formula O═C═N—Z—SiL$_3$ wherein Z and L are as previously defined.

In a second embodiment, the present disclosure provides an adhesion promoter according to the first embodiment, wherein, on an average basis, no more than half of the epoxy groups of the polyepoxide are reacted with the aminosilane.

In a third embodiment, the present disclosure provides an adhesion promoter according to the first or second embodiment, wherein the polyepoxide comprises N,N-diglycidyl-4-glycidyloxyaniline.

In a fourth embodiment, the present disclosure provides an adhesion promoter according to any one of the first to third embodiments, wherein the polyepoxide comprises 4,4'-methylenebis(N,N-diglycidylaniline).

In a fifth embodiment, the present disclosure provides an adhesion promoter according to any one of the first to fourth embodiments, wherein R$^1$ and R$^2$ independently represent —CH$_2$CH$_2$SiL$_3$ or —CH$_2$CH$_2$CH$_2$SiL$_3$.

In a sixth embodiment, the present disclosure provides an adhesion promoter according to any one of the first to fifth embodiments, wherein the isocyanatosilane has the formula O═C═N—CH$_2$CH$_2$CH$_2$SiL$_3$ or O═C═N—CH$_2$CH$_2$SiL$_3$.

In a seventh embodiment, the present disclosure provides an adhesion promoter according to any one of the first to sixth embodiments, wherein each L is independently selected from the group consisting of methoxy, ethoxy, and acetoxy.

In an eighth embodiment, the present disclosure provides a method of treating a surface of a substrate having chemically-bound surface hydroxyl groups, the method comprising:
providing an adhesion promoter comprising at least one ring-opened adduct of:
a) a polyepoxide having at least two epoxy groups;
b) an aminosilane represented by the formula

HNR$^1$R$^2$ wherein R$^1$ and R$^2$ independently represent —Z—SiL$_3$, wherein each Z independently represents a divalent linking group having from 1 to 12 carbon atoms, and wherein each L independently represents a hydrolyzable group, and
c) an isocyanatosilane represented by the formula O═C═N—Z—SiL$_3$ wherein Z and L are as previously defined; and
contacting the adhesion promoter with the surface of the substrate.

In a ninth embodiment, the present disclosure provides a method according to the eighth embodiment, wherein, on an average basis, no more than half of the epoxy groups of the polyepoxide are reacted with the aminosilane.

In a tenth embodiment, the present disclosure provides a method according to the eighth or ninth embodiment, wherein the polyepoxide comprises at least one of N,N-diglycidyl-4-glycidyloxyaniline or 4,4'-methylenebis(N,N-diglycidylaniline).

In an eleventh embodiment, the present disclosure provides a method according to any one of the eighth to tenth embodiments, wherein R$^1$ and R$^2$ independently represent —CH$_2$CH$_2$SiL$_3$ or —CH$_2$CH$_2$CH$_2$SiL$_3$.

In a twelfth embodiment, the present disclosure provides a method according to any one of the eighth to eleventh embodiments, wherein the isocyanatosilane has the formula O═C═N—CH$_2$CH$_2$CH$_2$SiL$_3$ or O═C═N—CH$_2$CH$_2$SiL$_3$.

In a thirteenth embodiment, the present disclosure provides a method according to any one of the eighth to twelfth embodiments, wherein each L is independently selected from the group consisting of methoxy, ethoxy, and acetoxy.

In a fourteenth embodiment, the present disclosure provides a method according to any one of the eighth to thirteenth embodiments, wherein the substrate comprises an abrasive particle.

In a fifteenth embodiment, the present disclosure provides an abrasive particle having an outer surface with an adhesion-modifying layer covalently bound thereto, wherein the adhesion-modifying layer comprises a reaction product of an adhesion promoter and hydroxyl groups covalently bound to the outer surface of the abrasive particle, wherein the adhesion promoter comprises at least one ring-opened adduct of:
a) a polyepoxide having at least two epoxy groups;
b) an aminosilane represented by the formula

HNR$^1$R$^2$ wherein R$^1$ and R$^2$ independently represent —Z—SiL$_3$, wherein each Z independently represents a divalent linking group having from 1 to 12 carbon atoms, and wherein each L independently represents a hydrolyzable group, and
c) an isocyanatosilane represented by the formula O═C═N—Z—SiL$_3$ wherein Z and L are as previously defined.

In a sixteenth embodiment, the present disclosure provides an abrasive particle according to the fifteenth embodiment, wherein the polyepoxide comprises at least one of N,N-diglycidyl-4-glycidyloxyaniline or 4,4'-methylenebis(N,N-diglycidylaniline)

In a seventeenth embodiment, the present disclosure provides an abrasive particle according to the fifteenth or sixteenth embodiment, wherein, on an average basis, no more than half of the epoxy groups of the polyepoxide are reacted with the aminosilane.

In an eighteenth embodiment, the present disclosure provides an abrasive particle according to any one of the fifteenth to seventeenth embodiments, wherein each L is independently selected from the group consisting of methoxy, ethoxy, and acetoxy.

In a nineteenth embodiment, the present disclosure provides an abrasive particle according to any one of the fifteenth to eighteenth embodiments, wherein the abrasive particle comprises alumina.

In a twentieth embodiment, the present disclosure provides a resin-bond abrasive article comprising a plurality of abrasive particles according to according to any one of the fifteenth to nineteenth embodiments retained in a binder material.

In a twenty-first embodiment, the present disclosure provides a resin-bond abrasive article according to the twentieth embodiment, wherein the binder material comprises a phenolic resin.

In a twenty-second embodiment, the present disclosure provides a resin-bond abrasive article according to the twentieth or twenty-first embodiment, wherein the resin-bond abrasive article comprises a resin-bond abrasive wheel.

In a twenty-third embodiment, the present disclosure provides a resin-bond abrasive article according to the twentieth or twenty-first embodiment, wherein the resin-bond abrasive article comprises a resin-bond abrasive cut-off wheel.

In a twenty-fourth embodiment, the present disclosure provides a resin-bond abrasive article according to any one of the twentieth to twenty-third embodiments, wherein, on an average basis, no more than half of the epoxy groups of the polyepoxide are reacted with the aminosilane.

In a twenty-fifth embodiment, the present disclosure provides a resin-bond abrasive article according to any one of the twentieth to twenty-fourth embodiments, wherein the polyepoxide comprises at least one of N,N-diglycidyl-4-glycidyloxyaniline or 4,4'-methylenebis(N,N-diglycidylaniline). In a twenty-sixth embodiment, the present disclosure provides a resin-bond abrasive article according to any one of the twentieth to twenty-fifth embodiments, wherein $R^1$ and $R^2$ independently represent —$CH_2CH_2SiL_3$ or —$CH_2CH_2CH_2SiL_3$.

In a twenty-seventh embodiment, the present disclosure provides a resin-bond abrasive article according to any one of the twentieth to twenty-sixth embodiments, wherein the isocyanatosilane has the formula O=C=N—$CH_2CH_2CH_2SiL_3$ or O=C=N—$CH_2CH_2SiL_3$.

In a twenty-eighth embodiment, the present disclosure provides an abrasive article according to any one of the twentieth to twenty-seventh embodiments, wherein each L is independently selected from the group consisting of methoxy, ethoxy, and acetoxy.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. In the examples, grams is abbreviated as "g", and wt. % means weight percent based on total weight unless otherwise specified.

Table 1, below, lists various materials used in the examples.

TABLE 1

| ABBRE-VIATION | DESCRIPTION |
| --- | --- |
| AP1 through AP2 | adhesion promoters, prepared according to Adhesion Promoter Synthesis, described below. |
| CAT1 | di-n-butyltin dilaurate (CAS#77-58-7) obtained from Alfa Aesar, Ward Hill, Massachusetts obtained from Sigma Aldrich, St. Louis, Missouri |
| CAT2 | Titanium (IV) 2-ethylhexanoate (CAS#3645-34-9) obtained from Alfa Aesar, Ward Hill, Massachusetts |
| DG | N,N-Diglycidyl-4-glycidyloxyaniline (CAS#5026-74-4) |
| MD | 4,4'-Methylenebis(N,N-diglycidylaniline) (CAS#28768-32-3) obtained from Sigma Aldrich, St. Louis, Missouri |
| TSIC | 3-(triethoxysilyl)propyl isocyanate (CAS#24801-88-5) obtained from from Sigma Aldrich, St. Louis, Missouri |
| SIL1 | N-(3-(Trimethoxysilyl) propyl)butylamine (CAS#31024-56-3), also referred to as Dynasylan 1189, obtained from Evonick, Parsippany, New Jersey |
| SIL2 | Bis[3-(triethoxysilyl)propyl]amine (CAS#13497-18-2), also referred to as Dynasylan 1122, obtained from Evonick, Parsippany, New Jersey |
| PO | paraffin oil (CAS#8012-95-1) |
| PP | a mixture of 39.4 wt. % of novolac phenolic resin (obtained as HEXION 0224P from Momentive Specialty Chemicals Columbus, Ohio), 8.2 wt. % of ZWSK F400 (obtained from Imerys Villach, Austria), 0.4 wt. % of carbon black (obtained as LUVOMAXXX LB/S from Lehmann & Voss & Co. KG Hamburg, Germany), and 52.0 wt. % of PAF (potassium aluminum fluoride from KBM Affilips Master Alloys, Delfzijl, Netherlands) |
| RP | liquid phenolic resin obtained as PREFERE 92 5136G1 from Dynea Erkner GmbH, Erkner, Germany |
| SAP1 | alpha alumina abrasive particles shaped as truncated triangular pyramids with equal base side lengths of 0.84 mm, a height of 0.168 mm (60+), and a sidewall inward taper angle of 8 degrees (i.e., the dihedral angle between any sidewall and the base is nominally 82 degrees) and having a surface coating of fine alumina particles; prepared as described hereinbelow |
| SAP2 | alpha alumina abrasive particles shaped as truncated triangular pyramids with equal base side lengths of 0.84 mm, a height of 0.168 mm (40+), and a sidewall inward taper angle of 8 degrees (i.e., the dihedral angle between any sidewall and the base is nominally 82 degrees) and having a surface coating of fine alumina particles; prepared as described hereinbelow |
| SCRIM1 | fiberglass mesh, obtained as "RXO 08-125 × 23 mm" from Rymatex Sp. z o. o., Rymanów, Poland |
| SCRIM2 | fiberglass mesh scrim attached to a cloth mesh, obtained as "RXV 08-125 × 23 mm" from Rymatex Sp. z. o. o., Rymanów, Poland |
| TOL | Toluene, obtained from Sigma Aldrich, St. Louis, Missouri |

Preparation of Abrasive Particles SAP

Precisely-shaped alpha alumina abrasive particles SAP in the examples were prepared according to the disclosure of Example 1 of U.S. Pat. No. 8,142,531 (Adefris et al.) by molding alumina sol-gel in equilateral triangular polypropylene mold cavities. Further, SAP had a coating of fine (about 0.5 micron) particles of alumina (HYDRAL COAT 5, obtained from Almatis, Pittsburgh, Pa.), this particle coating was applied according to the method of U.S. Pat. No. 5,213,591 (Celikkaya, et al.).

Adhesion Promoter Synthesis

AP1:

In a 100 mL 3-neck round bottom flask, 6.90 g DG, 10.61 g SIL2, and 17.50 g TOL were combined. The mixture was then continuously mixed for at least 24 hours at 70 C under nitrogen atmosphere to complete the reaction. The resulting solution was transferred to a 250 mL 1-neck round bottom flask then 6.16 g TSIC and 0.03 g CAT1 were added. The mixture was put on a rotary evaporator to remove the volatile solvent from the reaction. Typical water bath temperature to accelerate the solvent removal was 50 C and the highest vacuum level was less than 10 torr. After the evaporation, the resulting product was a slightly viscous yellow liquid with a minimum solid % of 98%
AP2:

In a 100 mL 3-neck round bottom flask, 9.47 g DG, 8.03 g SILL and 17.50 g TOL were combined. The mixture was then continuously mixed for at least 24 hours at 70 C under nitrogen atmosphere to complete the reaction. The resulting solution was transferred to a 250 mL 1-neck round bottom flask then 8.44 g TSIC and 0.03 g CAT1 were added. The mixture was put on a rotary evaporator to remove the volatile solvent from the Typical water bath temperature to accelerate the solvent removal was 50 C and the highest vacuum level was less than 10 torr. After the evaporation, the resulting product was a slightly viscous yellow liquid with a minimum solid % of 98%
AP3:

In a 100 mL 3-neck round bottom flask, 8.68 g MD, 8.82 g SIL2, and 17.50 g TOL were combined. The mixture was then continuously mixed for at least 24 hours at 70 C under nitrogen atmosphere to complete the reaction. The resulting solution was transferred to a 250 mL 1-neck round bottom flask then 5.12 g TSIC and 0.03 g CAT1 were added. The mixture was put on a rotary evaporator to remove the volatile solvent from the reaction. Typical water bath temperature to accelerate the solvent removal was 50 C and the highest vacuum level was less than 10 torr. After the evaporation, the resulting product was a slightly viscous yellow liquid with a minimum solid % of 98%
AP4:

In a 100 mL 3-neck round bottom flask, 11.24 g MD, 6.27 g SILL and 17.50 g TOL were combined. The mixture was then continuously mixed for at least 24 hours at 70 C under nitrogen atmosphere to complete the reaction. The resulting solution was transferred to a 250 mL 1-neck round bottom flask then 6.58 g TSIC and 0.03 g CAT1 were added. The mixture was put on a rotary evaporator to remove the volatile solvent from the reaction. Typical water bath temperature to accelerate the solvent removal was 50 C and the highest vacuum level was less than 10 torr. After the evaporation, the resulting product was a slightly viscous yellow liquid with a minimum solid percent of 98%.
Grain Treatment One part CAT2 and 100 parts of adhesion promoter were combined and the resulting solution was mixed thoroughly. The solution was applied onto abrasive particles neat, without solvent addition. A typical coating process was conducted in a 1 L glass jar with 300-500 g of abrasive particles. By means of a pipette, the catalyst added adhesion promoter solution was added to the abrasive grain while the abrasive grain was continuously mixed with a mechanical stirrer (IKA Eurostar 20 digital mixer) equipped with a metal two-blade stirrer. Typical rpms for the mechanical stirrer during the mixing process ranged from 300-600 rpm. Mixing of the abrasive grain continued until a uniform coating was achieved. The abrasive particles were left to sit at room temperature for 10 minutes to 1 month before using. The extended time after mixing was to allow the condensation reaction between the AP and the abrasive particle. The amount of adhesion promoter for the experiments was 0.2 part per 100 parts of abrasive particles. For each AP1 and AP2, 400 g of SAP1 and 200 g of SAP2 were coated.

Example 1

RP (60 g) was added to a preblended 400 g 0.2 wt % AP1 coated SAP1 and 200 g 0.2 wt % AP1 coated SAP2, and the combination was mixed in a KitchenAid Commercial mixer (Model KSM C50S) for 7 minutes at speed 1. This mixture was then combined with 321.5 g of PP and mixed for an additional 7 minutes. In the middle of the second mixing step, 5 mL PO was added to the mixture.

Comparative Example A

Example 1 was repeated, except the abrasive grains used were 400 g SAP1 and 200 g SAP2.

Comparative Example B

Example 1 was repeated, except the abrasive grains used were 400 g 0. wt % AP2 coated SAP1 and 200 g 0.2 wt % AP2 coated SAP2.

Example 2

Example 1 was repeated, except the abrasive grains used were 400 g 0.2 wt % AP3 coated SAP1 and 200 g 0.2 wt % AP2 coated SAP3.

Comparative Example C

Example 1 was repeated, except the abrasive grains used were 400 g 0.2 wt % AP4 coated SAP1 and 200 g 0.2 wt % AP4 coated SAP2.
Preparation of Abrasive Articles The mixes of Examples 1-2 and Comparative Examples A-C were left to sit in ambient conditions for 20 hrs. Next, each mixture was sieved through a 14-mesh screen (+14/pan) to remove agglomerates. A 125-mm diameter disc of SCRIM2 was placed in the bottom of a 125-mm diameter mold cavity. The mold had an inner diameter of 23 mm. A fill mixture (27.5 g) from Example 1 was spread on top of the SCRIM2. SCRIM1 was then placed on top of the fill mixture and a small 700 mm diameter experimental label was placed on top of the scrim. A metal flange 28 mm×22.45 mm×1.2 mm from Lumet PPUH in Jaslo, Poland was placed on top of each label. The mold was closed and the scrim-fill-scrim sandwich was pressed at a load of pressed 30 tons (244.5 kg/cm$^2$) at room temperature for 3 sec. At least six wheels were made from each mix. After pressing, the cut-off wheel precursors were then removed from the mold and were placed on a stack between aluminum plates and PTFE sheets in order to keep the shape during the curing program. The wheels were cured in a stack with a 30 hr cure cycle: 2 hr to 75° C., 2 hr to 90° C., 5 hr to 110° C., 3 hr to 135° C., 3 hr to 188° C., 13 hr at 188° C., and a then 2 hr cool-down to 60° C. The final thickness of the wheel was approximately 0.053 inch (1.35 mm).
Cutting Test Method A 40-inch (101.6-cm) long sheet of ⅛ inch (3.2 mm) thick stainless steel was secured with its major surface inclined at a 35-degree angle relative to horizontal. A guide rail was secured along the downward-sloping top surface of the inclined sheet. A DeWalt Model D28114 4.5-inch (11.4-cm)/5-inch (12.7-cm) cut-off wheel angle grinder was secured to the guide rail such that the tool was guided in a downward path under the force of gravity.

A cut-off wheel for evaluation was mounted on the tool such that the cut-off wheel encountered the full thickness of the stainless steel sheet when the cut-off wheel tool was released to traverse downward, along the rail under gravitational force. The cut-off wheel tool was activated to rotate the cut-off wheel at 12000 rpm, the tool was released to begin its descent, and the length of the resulting cut in the stainless steel sheet was measured after 60 seconds (One Minute Cut). Dimensions of the cut-off wheel were measured before and after the cutting test to determine wear. Three cut-off wheels from each Example and Comparative Example were tested as-made, and also after 14 days of aging in a 90% RH and 90° F. (32° C.) environmental chamber and then conditioning of 2 hours at 50° C.

One minute cut was measured as the distance that the cutting wheel abraded through the stainless steel sheet in one minute. The wear rate is the loss of wheel volume as a function of the time the wheel cut. The performance, is the one minute cut length divided by the wear rate. Results of the Cutting Test for Examples 1-2 and Comparative Examples A-C are reported in Table 2, below. The TSIC used in conjunction with the SIL2 shows less of a drop between the as-made samples and the aged samples.

TABLE 2

| EXAMPLE | ONE MINUTE CUT, mm | | WEAR RATE, mm³/min | | PERFORMANCE, mm²/min | |
|---|---|---|---|---|---|---|
| | As-Made (average) | Aged (average) | As-Made (average) | Aged (average) | As-Made (average) | Aged (average) |
| 1 | 1385, 1325, 1355 (1355) | 1355, 1219, 1325 (1300) | 3002, 2716, 3132 (2950) | 5489, 5585, 6055 (5710) | 0.46, 0.49, 0.43 (0.46) | 0.25, 0.22, 0.22 (0.23) |
| Comp. Ex. A | 1325, 1355, 1418 (1366) | 1355, 919, 942 (1072) | 3160, 3351, 3428 (3313) | 5924, 8457, 8229 (7537) | 0.42, 0.40, 0.41 (0.41) | 0.23, 0.11, 0.11 (0.15) |
| Comp. Ex. B | 1385, 1355, 1418 (1386) | 1244, 790, 773 (936) | 4041, 4987, 3168 (4066) | 7378, 9831, 9071 (8760) | 0.33, 0.27, 0.45 (0.35) | 0.17, 0.08, 0.09 (0.11) |
| 2 | 1385, 1355, 1297 (1346) | 1297, 1270, 1297 (1288) | 3128, 2437, 2550 (2705) | 5892, 6266, 6747 (6302) | 0.44, 0.56, 0.51 (0.50) | 0.22, 0.20, 0.19 (0.21) |
| Comp. Ex. C | 1297, 1325, 1325 (1313) | 1297, 1219, 985 (1167) | 2942, 3609, 2508 (3020) | 6382, 7804, 7958 (7283) | 0.44, 0.37, 0.53 (0.45) | 0.20, 0.16, 0.12 (0.16) |

The preceding description, given in order to enable one of ordinary skill in the art to practice the claimed disclosure, is not to be construed as limiting the scope of the disclosure, which is defined by the claims and all equivalents thereto.

What is claimed is:

1. A method of treating a surface of an abrasive particle having chemically-bound surface hydroxyl groups, the method comprising:
   providing an adhesion promoter comprising at least one ring-opened adduct of:
   a) a polyepoxide having at least two epoxy groups;
   b) an aminosilane represented by the formula $HNR^1R^2$ wherein $R^1$ and $R^2$ independently represent $-Z-SiL_3$, wherein each Z independently represents a divalent linking group having from 1 to 12 carbon atoms, and wherein each L independently represents a hydrolyzable group, and
   c) an isocyanatosilane represented by the formula

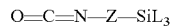
   $O=C=N-Z-SiL_3$ wherein Z and L are as previously defined; and
   contacting the adhesion promoter with the surface of the abrasive particle.

2. The method of claim 1, wherein, on an average basis, no more than half of the epoxy groups of the polyepoxide are reacted with the aminosilane.

3. The method of claim 1, wherein the polyepoxide comprises at least one of N,N-diglycidyl-4-glycidyloxyaniline or 4,4'-methylenebis(N,N-diglycidylaniline).

4. The method of claim 1, wherein $R^1$ and $R^2$ independently represent $-CH_2CH_2SiL_3$ or $-CH_2CH_2CH_2SiL_3$.

5. The method of claim 1, wherein the isocyanatosilane has the formula $O=C=N-CH_2CH_2CH_2SiL_3$ or $O=C=N-CH_2CH_2SiL_3$.

6. The method of claim 1, wherein each L is independently selected from the group consisting of methoxy, ethoxy, and acetoxy.

7. An abrasive particle having an outer surface with an adhesion-modifying layer covalently bound thereto, wherein the adhesion-modifying layer comprises a reaction product of an adhesion promoter and hydroxyl groups covalently bound to the outer surface of the abrasive particle, wherein the adhesion promoter comprises at least one ring-opened adduct of:
   a) a polyepoxide having at least two epoxy groups;
   b) an aminosilane represented by the formula

   $HNR^1R^2$ wherein $R^1$ and $R^2$ independently represent $-Z-SiL_3$, wherein each Z independently represents a divalent linking group having from 1 to 12 carbon atoms, and wherein each L independently represents a hydrolyzable group, and
   c) an isocyanatosilane represented by the formula

   $O=C=N-Z-SiL_3$ wherein Z and L are as previously defined.

8. The abrasive particle of claim 7, wherein the polyepoxide comprises at least one of N,N-diglycidyl-4-glycidyloxyaniline or 4,4'-methylenebis(N,N-diglycidylaniline).

9. The abrasive particle of claim 7, wherein, on an average basis, no more than half of the epoxy groups of the polyepoxide are reacted with the aminosilane.

10. The abrasive particle of claim 7, wherein each L is independently selected from the group consisting of methoxy, ethoxy, and acetoxy.

11. The abrasive particle of claim 7, wherein the abrasive particle comprises alumina.

12. A resin-bond abrasive article comprising the abrasive particle of claim 7 retained in a binder material.

13. The resin-bond abrasive article of claim 12, wherein the binder material comprises a phenolic resin.

14. The resin-bond abrasive article of claim 12, wherein the resin-bond abrasive article comprises a resin-bond abrasive wheel.

15. The resin-bond abrasive article of claim 12, wherein the resin-bond abrasive article comprises a resin-bond abrasive cut-off wheel.

16. The resin-bond abrasive article of claim 12, wherein, on an average basis, no more than half of the epoxy groups of the polyepoxide are reacted with the aminosilane.

17. The resin-bond abrasive article of claim 12, wherein the polyepoxide comprises at least one of N,N-diglycidyl-4-glycidyloxyaniline or 4,4'-methylenebis(N,N-diglycidylaniline).

18. The resin-bond abrasive article of claim 12, wherein $R^1$ and $R^2$ independently represent $-CH_2CH_2SiL_3$ or $-CH_2CH_2CH_2SiL_3$.

19. The resin-bond abrasive article of claim 12, wherein the isocyanatosilane has the formula $O=C=N-CH_2CH_2CH_2SiL_3$ or $O=C=N-CH_2CH_2SiL_3$.

20. The resin-bond abrasive article of claim 12, wherein each L is independently selected from the group consisting of methoxy, ethoxy, and acetoxy.

\* \* \* \* \*